July 11, 1939.  C. H. SMITH  2,165,946
HANDLING OF DUSTS, ETC
Filed July 30, 1935
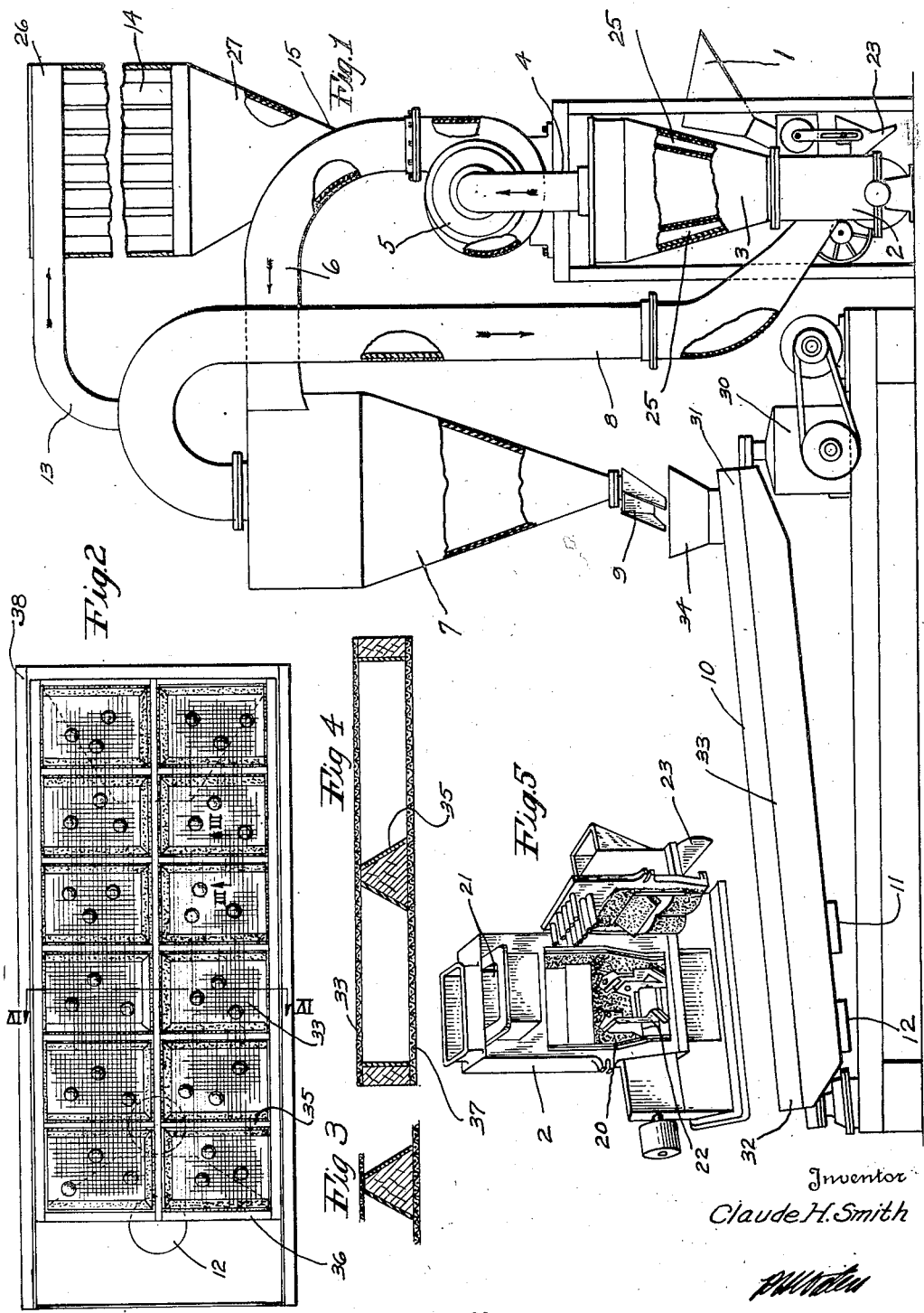
Inventor
Claude H. Smith Patented July 11, 1939

2,165,946

UNITED STATES PATENT OFFICE 2,165,946

HANDLING OF DUSTS, ETC.

Claude H. Smith, Tallmadge, Ohio, assignor to Wingfoot Corporation, Wilmington, Del., a corporation of Delaware Application July 30, 1936, Serial No. 93,395

4 Claims. (Cl. 83—94)

This invention relates to the handling of dusts or fine powders such as finely powdered pigments and other organic and inorganic products, and apparatus therefor. It includes particularly the conveyance of such dusts or powders through suitable ducts, the production of such dusts in pulverizers, their separation in devices such as cyclones and the screening of such materials and other operations in which such materials are handled in dust form. More particularly the invention relates to the handling of such dusts which tend to adhere to metallic surfaces and, according to the improved method of this invention the dusts are handled in apparatus which has been lined with rubber or other material having electrical properties similar to rubber. It has been found that by rubber-lining ducts, pulverizers, separators, etc., and covering the frame work of screens with rubber the adherence of the dust to exposed surfaces is very substantially reduced and may be almost entirely eliminated, and the clogging of apparatus thus prevented. The invention includes both the method of handling dusts or powders, and apparatus for handling the same.

It is not unusual to line ducts, pulverizers, etc. with rubber or like material to prevent abrasion of the exposed surfaces. The only effect of such lining is to serve as a cushion to protect the metallic surface from abrasion. Such linings are known in sand-blasting apparatus and the like. In such operations there is no tendency for the sand (or other particles carried by the air blast) to adhere to the walls of the apparatus since the abrasion of the walls keeps them clean.

As distinguished from such prior art the present invention relates to the transportation and other treatment of dust particles which tend to adhere to exposed surfaces of the treating apparatus. In the manufacture of pigments, dyestuffs, organic compounds of many types and many inorganic materials, it is customary to convey the material in dust form from one location to another by blowing it through a metal duct. The material may for example, be blown from a pulverizer to a separator or sifter through such a duct. The material is carried by a blast of air which is sufficient to effect the desired transportation without abrasion of exposed surfaces of the apparatus. It is generally recognized that in such operations the dust often tends to collect on the walls of the apparatus and deposits are formed which eventually tend to clog the ducts or other apparatus. In pulverizers the dust particles build up and clog the pulverizer so that it is necessary at not infrequent intervals to cease all pulverizing operations in order that the deposit may be removed from the pulverizer. In ducts it is customary for employees to tap or pound the ducts to loosen any deposit and thus free the ducts. The pounding or hammering to which workmen subject such apparatus distorts its shape and thus actually increases the tendency of dust particles to collect and necessitates replacements all too frequently. Similarly in separators of the cyclone type, etc., clogging difficulties are quite common. In screen where balls, for example, are used to vibrate the screen the dust tends to become packed on the frames of the screen by the pounding action of the balls. It has been found that the tendency of dust particles to thus adhere to the walls of the ducts or other apparatus can be overcome by lining the walls with rubber or a rubber-like material.

A very extensive investigation of this situation and particularly the adherence of dust particles to the walls of ducts, indicates that the adherence of the duct particles to the walls is in large part due to an electrical phenomenon. Although the flexibility of rubber tends to prevent adherence and caking of the dust, this is a less important factor. The value of rubber in preventing the adherence of dust particles to the exposed metallic surface appears to be due largely to the unique electrical properties of the rubber and particularly to the fact that rubber is a dielectric, it is easily charged with tribo-electricity, and any static charge formed on it is not readily dissipated. Another property of rubber which makes it a desirable material is its low thermal conductivity. (In stating that rubber is a good dielectric it is appreciated that differently compounded rubbers vary in dielectrical properties and those exceptional rubbers which are specially compounded so as to make them better conductors of electricity are not included among the rubbers referred to herein in general terms.)

It has long been recognized that dust particles settle out on cool surfaces more rapidly than on heated surfaces. This is noticeable in a plastered house where the dust settles more rapidly on the plaster surfaces of the walls between the laths than it does upon the surfaces over the laths. The laths are poorer conductors of heat than the plaster and the portions of the walls between the laths therefore cool more rapidly than the portions over the laths and the dust consequently separates out more readily on these cooled portions. This is, no doubt, due to the fact that on contacting with a cool surface the dust particles lose some energy and fail to rebound, thus being deposited. The same law apparently covers the action of dust particles in rubber-lined metallic ducts, etc. At least a portion of the particles which do not have sufficient energy to rebound from a metallic pipe, have sufficient energy to rebound from the rubber lining.

A more important result of rubber-lining the ducts is due to the fact that rubber is a dielectric and is easily given a tribo-electric charge. Most dust particles possess an electrostatic charge. Most pulverizing operations produce such a charge on the pulverized materials. They also receive a charge on being blown through a duct. Likewise the blowing of air over the walls of a duct produces a tribo-electric charge on the walls. If the walls are of metal this charge is of course readily dissipated. Rubber being a dielectric, the rubber lining of the ducts retains the charge. In a majority of cases the charge on dust particles is negative, and the charge on vulcanized rubber compounded in the usual way is likewise negative. With like charges on the dust particles and the walls of the ducts, the tendency is for the dust particles to be repelled from the walls and the advantages of using rubber lined ducts may be largely attributed to this fact.

The charge on dust particles has been extensively investigated. In certain instances the sign of the charge was found to depend upon whether or not the dust particles possessed a charge before being blown thru the rubber-lined duct. Regardless of the sign of the charge it was found that less dust adhered to the rubber lining than to the metal duct.

The invention has been studied more particularly in connection with the handling of mercaptobenzothiazole (known in the trade as "Captax"). In pulverizing this material in the ordinary rotary pulverizer it was found that the Captax adhered to the walls of the pulverizer and became packed on the walls so that it was necessary to open the pulverizer at frequent intervals to remove the deposit. On coating the walls of the pulverizer with rubber such packing was negligible. From the pulverizer the Captax was blown to a cyclone separtor through metal ducts. It adhered to the ducts and it was necessary at frequent intervals to pound the ducts or otherwise cause them to vibrate to separate adhering Captax particles. The dust collected in the ducts, at first, was a fuzz and this rapidly built up into an appreciable deposit which eventually would have completely closed the ducts. In plant operations the ducts are tapped at intervals to loosen the dust adhering to them and thus prevent their becoming stopped. It was found that by rubber lining these ducts the deposit of Captax upon them was almost entirely prevented. Likewise in the cyclone separator used to separate the dust from the current of air employed to carry it along, the collection of dust on the metallic walls of the cyclone can be prevented by rubber lining the cyclone. The Captax recovered in the cyclone was sifted in a sifter of the gyratory type in which rubber balls in a compartment below the screen of the sifter bouncing against the wooden frame of the screen greatly expedite the sifting of the material. Past experience had shown that the Captax dust collected on the frames of the screens and that the rubber balls bouncing against this packed it into a cake which later flaked off and reduced the average fineness of the sifted particles. The collection of Captax on the screen frames was eliminated by covering the frames with rubber.

In all of these experiments rubber having the following approximate formula was found satisfactory:

| | Per cent |
|---|---|
| Rubber | 48.7 |
| Black | 43.5 |
| Zinc oxide | 2.9 |
| Sulphur }<br>Accelerator }<br>Softeners } | 4.9 |

Rubber of this type will give satisfactory results when used for lining equipment of the type shown in the drawings. Other rubbers differently compounded will likewise be satisfactory, for example:

| | Per cent |
|---|---|
| Rubber | 25 |
| Fillers (such as whiting, etc.) | 58 |
| Inorganic accelerators | 12 |
| Zinc oxide }<br>Sulphur } | 5 |

The invention will be described in greater detail in connection with the accompanying drawing but it is to be understood that it is not limited to the process and apparatus there described.

Fig. 1 shows apparatus for pulverizing, separating and screening, etc.;

Fig. 2 is a plan view of the screen;

Figs. 3 and 4 are sectional views of the screen on the lines 3—3 and 4—4; and

Fig. 5 is an enlarged view of the pulverizer with one side open to show the interior.

In handling mercaptobenzothiazole in such apparatus it is fed through the chute 1 into the pulverizer 2 where it is broken down to small particles which are drawn into the separator 3 where the coarser particles are separated from the finer particles. The coarser particles are returned to the pulverizer and the finer particles are conveyed through the pipe 4 by the blower 5 through the pipe 6 into the cyclone separator 7. The finer particles separate from the air in this cyclone separator and the air is returned through the pipe 8 and re-used to remove the pulverized material from the pulverizer 2.

From the cyclone separator 7 the finely divided mercaptobenzothiazole is discharged through the spout 9 onto the screen 10. The screened material is collected through the opening 11 and the coarser material which does not pass through the screens is delivered through the opening 12. This coarser material is advantageously returned to the pulverizer.

A small quantity of fresh air is taken into the air-circulating system through cracks and openings and this is desirable as it keeps the air cool. The excess air is vented through the pipe 13 and the cloth tubes 14. Superfine particles separated in the cloth tubes are collected in any suitable manner from the bottom opening 15 below these cloth tubes.

As indicated the enclosing walls of the air flotation system are rubber lined. The interior of the pulverizer 2 is lined with rubber 20 as shown in Fig. 5. The mercaptobenzothiazole in unpowdered form is fed to the pulverizer through the opening 21 by means of the chute or pipe 1. It is subdivided by contact with the blades or propellers 22 which are rotated at high speed, e. g., 3500 R. P. M. This breaks and pulverizes the mercaptobenzothiazole. Hard unpulverizable material, such as foreign matter, etc., is discharged through the kick-off 23. Air which enters the pulverizer through the pipe 8 carries the pulverized material up through the outer channel 25 of the separator 3 to the top of the separator where coarser material settles out from the finer material by gravity and falls back to the pulverizer. This outer channel 25 is rubber-lined as shown to prevent the adherence of the pulverized material thereto. In the top of the separator the air and pulverized material passes through openings which connect the outside channel with the interior portion of the separator. These openings are not shown. Their size is regulated in the usual manner by adjustable vanes which likewise are not shown. This type of apparatus (except for the rubber lining) is well known in the art and other apparatus which accomplishes the same purpose may be substituted for it and those parts of such other apparatus through which the pulverized material is air-floated may likewise be rubber-lined to advantage.

In the separator 3 the heavier particles of mercaptobenzothiazole settle out of the air and are returned to the pulverizer 2 and the lighter particles pass through the rubber-lined pipe 4 into the blower 5 from which they are blown through the pipe 6 to the separator 7. The blower 5 and pipe 6 are both rubber-lined. This prevents the accumulation of mercaptobenzothiazole on the walls.

The separator 7 operates on the well-known cyclone principle. It is so constructed and operated that the mercaptobenzothiazole particles settle out of the air and are collected through the spout 9. The air then passes through the pipe 8 back to the pulverizer. The separator 7 and pipe 8 are both rubber-lined to prevent the accumulation of mercaptobenzothiazole on their walls. Excess air is conducted through the pipe 13 to the filter bags 14. The pipe 13 is rubber-lined and the top 26 and the bottom 27 of the filter which are connected by the cloth tubes 14 are both rubber-lined to prevent the accumulation of mercaptobenzothiazole on the walls.

The pulverizer shown is merely illustrative of many different types of pulverizers and subdividers that may be employed. Ball mills, hammer mills, roller mills, etc., which may be employed for subdivision of such materials as mercaptobenzothiazole, may be rubber-lined to prevent the adherence of the mercaptobenzothiazole etc. to the walls thereof. Instead of employing a pressure system of air flotation a vacuum system may be utilized and the walls of the suction fan and treating apparatus may be rubber-lined to prevent the adhesion of mercaptobenzothiazole or like material thereto. Although in the preferred method and apparatus illustrated in the drawing, all of the walls with which the air and pulverized material come in contact are rubber-lined, the invention is not limited thereto, as rubber-lining may be omitted from those portions of the walls where no difficulty is experienced with adherence and accumulation of mercaptobenzothiazole.

The finely divided material which separates in the cyclone 7 is delivered onto the screen 33 of the screening apparatus 10. The apparatus shown is of the "Rotex" type. The apparatus 30 imparts a circular motion to the midpoint of the head 31 of the screen, and the corners of the foot 32 of the screen slide back and forth in suitable guides provided for the purpose. The screen 33 is supported by partitions 35 which divide the area under the screen into many sections. Each section contains several balls of resilient rubber. As shown in Figs. 3 and 4 the partition running under the middle of the screen and the cross partitions all have beveled edges so that as the screen is moved from side to side and the balls are thrown against the partitions they bounce from the beveled edges against the screen which they support and thus continuously tap the screen on the under side and cause the fine material to pass through it. The beveled edges of these partitions and the edge of the frame 36 which supports the screen are rubber coated as shown in Figs. 3 and 4. Without such rubber coating mercaptobenzothiazole stuck to these surfaces. By coating the surfaces with rubber the adhesion of the mercaptobenzothiazole is prevented. The adhesion of mercaptobenzothiazole to those surfaces was particularly undesirable because with the constant bouncing of the balls onto these surfaces the mercaptobenzothiazole which stuck to them was packed into a hard cake which eventually became separated from the partitions as fairly large flakes as the operation continued and became mixed with the finely screened material and caused difficulty.

The material which passes through the screen 33 readily passes through the screen 37 which is of large mesh and supports the balls 38. Below this coarser screen 37 is a collection compartment through which the fine material passes to the opening 11. The coarse material which does not pass through the fine screen 33 passes over the foot of the screen and is collected through the opening 12. The entire surface of the collecting compartment located below the screen 37 is advantageously coated with rubber to prevent the adhesion of the screened mercaptobenzothiazole thereto, and the end compartment through which the coarser material passes to the opening 12 is advantageously rubber-lined.

Although but one particular type of screen is shown in the drawing, it is illustrative of the application of the invention to other screens of this general type. In general any surface under a screen which is exposed to screened material is advantageously covered with rubber. This surface may be a metal surface or a wooden surface. The screen may be of stationary type and it may be of the type in which mechanical means is provided for tapping or moving the screening cloth to aid the passage of fine material therethrough. The screen may be of the type in which the frame and screen supported thereby are violently agitated to cause the fine particles to pass through the screen. In any of these types of apparatus supporting frames, etc., under the screen and collection compartments, etc., are advantageously rubber covered to prevent the accumulation of the screened material on them and thus to prevent the agglomeration of fine particles of the screened material to a size which would not pass through the screen. Contamination of the screened material by such agglomerates is thus prevented.

The screen may be of the type in which several screening cloths are arranged one above another and in which the powdered material is progressively separated into coarser and finer particles in passing through screens of different mesh. The walls enclosing screens of this type are advantageously rubber covered to prevent the accumulation thereon of the material being screened. All types of vibrating screens are improved by the rubber covering of solid surfaces exposed to the finely divided product.

In all these various applications of the invention the rubber may be applied to the various surfaces in different ways. For example, rubber sheeting may be tacked or cemented or otherwise fastened to the walls. The rubber may be applied as a cement where this is satisfactory. In apparatus, such as the screen shown in the drawing, the various partitions indicated may be rubber coated by slipping rubber tubing over them. The rubber will ordinarily be vulcanized before being applied as a protective surface, but this is not necessary as it may be vulcanized in place. Instead of using pure rubber, rubberized fabric may be employed in suitable places as for lining pipes, etc. Both wooden and metal pipes and pipes of other materials may be rubber coated according to the invention to prevent the adhesion of powdered material thereto.

Although in the above description the handling of Captax has been described more particularly it is to be understood that other dust particles may be similarly handled to advantage in rubber lined ducts, etc. For example such dusts as lithopone, zinc oxide, and tetramethylthiuramdisulphide (tuads), may advantageously be handled in such equipment. Dusts which possess a positive charge are advantageously handled in ducts lined with rubber which acquires a relatively positive tribo-electric charge.

Instead of using natural rubbers, synthetic rubbers such as Duprene may be employed. Rubber derivatives such as rubber hydrochloride have given satisfactory results. All of these various rubber-like materials are good electrical insulators, are easily given a tribo-electric charge, and have a tendency to retain any static charge produced in or on them.

Although the invention has been described more particularly in connection with certain units of apparatus, it is to be understood that it applies more generally to the handling of dusts in rubber lined metal equipment to which the dust would adhere more readily if the equipment were not rubber lined.

I claim:

1. The method of treating a material which on pulverizing possesses a negative triboelectric charge, which comprises dry pulverizing it to dust form in a rubber-lined pulverizer, floating it in a blast of air through a rubber-lined duct to a rubber-lined separator and therein separating the dust from the air used to convey it.

2. The method of treating a non-corrosive material which on dry pulverizing possesses a negative triboelectric charge, which comprises pulverizing dry the material to a dust in a rubber-lined pulverizer, conveying the dust through a rubber-lined duct by flotation in a blast of air, separating the dust from the air and then screening the dust down through a screen the frames of which are covered with rubber while agitating the screen by bouncing rubber balls against the under surface of the screen and rubber-covered frames.

3. The method of pulverizing a material which in dust form has an electric charge which on contact with the metal of the pulverizer is dissipated with deposition of dust on the pulverizer and eventual caking of the dust in the pulverizer which comprises dry pulverizing said material to a dust in a rubber-lined pulverizer.

4. The method of dry pulverizing materials, which because of their triboelectric charge when pulverized adhere to metals but not to a rubber-like dielectric, which comprises grinding said materials in a metal mill lined with said dielectric at those positions of the mill at which the dust would adhere if not lined.

CLAUDE H. SMITH.